United States Patent
Yi et al.

(10) Patent No.: US 8,336,217 B2
(45) Date of Patent: Dec. 25, 2012

(54) NODE PLACEMENT APPARATUS, SYSTEM AND METHOD

(75) Inventors: Wei Yi, Mountain View, CA (US); John Paul Strachan, Millbrae, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 241 days.

(21) Appl. No.: 12/790,970

(22) Filed: May 31, 2010

(65) Prior Publication Data

US 2011/0289787 A1    Dec. 1, 2011

(51) Int. Cl.
G01B 11/00    (2006.01)
G01B 11/26    (2006.01)

(52) U.S. Cl. .......................................... 33/286; 33/228
(58) Field of Classification Search ............. 33/DIG. 21, 33/1 G, 286, 290, 228
See application file for complete search history.

(56) References Cited

U.S. PATENT DOCUMENTS

| | | | | |
|---|---|---|---|---|
| 5,388,318 | A * | 2/1995 | Petta ............................... | 33/228 |
| 5,757,499 | A * | 5/1998 | Eaton ............................ | 356/620 |
| 5,920,394 | A * | 7/1999 | Gelbart et al. ................ | 356/615 |
| 6,725,551 | B1 * | 4/2004 | Sutton ............................ | 33/286 |
| 6,971,063 | B1 * | 11/2005 | Rappaport et al. ............ | 715/733 |
| 7,003,890 | B2 * | 2/2006 | Kavounas ...................... | 33/286 |
| 7,395,195 | B2 | 7/2008 | Suenbuel et al. | |
| 7,614,154 | B2 * | 11/2009 | Cobb ........................... | 33/1 BB |
| 7,860,507 | B2 * | 12/2010 | Kalika et al. .................. | 455/446 |
| 7,866,052 | B2 * | 1/2011 | Schulze ......................... | 33/1 G |
| 7,979,993 | B2 * | 7/2011 | Tippett et al. ..................... | 33/228 |
| 8,006,394 | B2 * | 8/2011 | Tippett et al. .................... | 33/228 |
| 2005/0274029 | A1 * | 12/2005 | Kavounas ....................... | 33/286 |
| 2006/0196059 | A1 * | 9/2006 | Berto .............................. | 33/286 |
| 2007/0005292 | A1 | 1/2007 | Jin | |
| 2009/0056153 | A1 * | 3/2009 | Tippett et al. .................... | 33/228 |
| 2009/0307913 | A1 * | 12/2009 | Schulze ......................... | 33/1 G |
| 2011/0007663 | A1 * | 1/2011 | Scotton et al. ................ | 370/254 |
| 2011/0044206 | A1 * | 2/2011 | Kalika et al. ................... | 370/254 |
| 2011/0267220 | A1 * | 11/2011 | Strachan et al. .............. | 342/126 |
| 2011/0289787 | A1 * | 12/2011 | Yi et al. .......................... | 33/228 |
| 2012/0001017 | A1 * | 1/2012 | Strachan et al. ................ | 244/24 |
| 2012/0192441 | A1 * | 8/2012 | Strachan et al. ................ | 33/1 H |

OTHER PUBLICATIONS

Radu Stroleru et al., "Walking GPS: A Practical Solution for Localization in Manually Deployed Wireless Sensor Networks," Proceedings of the 29th Annual IEEE International Conference on Local Computer Networks (LCN'04), 2004, pp. 480-489.

Lewis Girod et al., "The Design and Implementation of a Self-Calibrating Distributed Acoustic Sensing Platform," Proceedings of the 4th international conference on Embedded networked sensor systems, 2006, pp. 71-84.

(Continued)

Primary Examiner — Yaritza Guadalupe-McCall

(57) ABSTRACT

A node placement apparatus, system and method employ an optical source to define a grid for placement of nodes. The node placement apparatus includes a structure that provides a predetermined height and the optical source positioned at the predetermined height. The optical source is configured to produce an optical beam having a predetermined declination angle. The optical beam is configured to provide illumination of a plurality of discrete points on a surface to define the grid. The system further includes the nodes. The method of node placement includes locating the optical source above a fixed point on and at the predetermined height above the surface, illuminating the plurality of discrete points with the optical beam, and positioning a node at a selected discrete point of the plurality of discrete points illuminated by the optical beam.

20 Claims, 3 Drawing Sheets

OTHER PUBLICATIONS

Zhanyang Zhang, "A Cluster Based Approach Toward Sensor Localization and K-Coverage Problems," Ubiquitous Computing and Communication Journal, vol. 2, No. 4, 2007. pp. 15-23.
Radu Stroleru et al.,"A High-Accuracy, Low-Cost Localization System for Wireless Sensor Networks," Proceedings of the 3rd international conference on Embedded networked sensor systems, 2005, pp. 13-26.
Radu Stroleru et al.,"StarDust: A Flexible Architecture for Passive Localization in Wireless Sensor Networks," Proceedings of ACM Conference on Embedded Networked Sensor Systems (SenSys), Boulder, CO, 2006, pp. 57-70.
Shlomi Arnon et al., "Searching for a Lion in the Desert: Optics-based Acquisition Algorithms for Wireless Sensor Networks," Mobile Computing and Communications Review, vol. 12, No. 4, Oct. 2008, pp. 32-42.

* cited by examiner

US 8,336,217 B2

NODE PLACEMENT APPARATUS, SYSTEM AND METHOD

CROSS-REFERENCE TO RELATED APPLICATIONS

N/A

STATEMENT REGARDING FEDERALLY SPONSORED RESEARCH OR DEVELOPMENT

N/A

BACKGROUND

Grids, especially regular grids, are often used in laying out or deploying various elements or nodes of a system. For example, an array of seismic sensors or seismic sensor nodes (e.g., geophones or accelerometers) as a sensor system may be deployed over a field as a regular grid (e.g., a rectangular grid with even spacing between sensor nodes) in support of subsurface exploration activities. In another example, a grid of sensor nodes that provide measurements of a local environment (e.g., temperature, pressure, wind speed, moisture, etc.) may be employed to monitor weather patterns in a region. In yet another example, solar panels of a solar array system, water sprinklers, and even plants or seedlings in precision agriculture may be arranged and deployed in a regular array. In addition, many node-based systems that employ regular grids may require or at least benefit from a deployment that provides accurate information about specific node locations. For example, accurate node location information may be critical for reconstructing and analyzing data gathered from or with respect to the nodes (e.g., sensor nodes).

Unfortunately, deployment of nodes may be a technically difficult and overly time-consuming prospect, especially when location accuracy is an important factor. For example, to deploy an array of seismic sensor nodes in a field for subsurface structure exploration and mapping, grid points of the regular grid must first be determined and laid out across the field. Laying out the regular grid generally requires a two-person crew with accuracy being a function of the skill of the crew. The nodes (e.g., sensors nodes, seedlings, solar panels, etc.) then need to be placed on the determined grid points. Speed of node deployment may be improved by installing the nodes as the grid is established and laid out, for example. However, deployment speed may still be relatively slow since each grid location must first be individually measured prior to installing the node at each grid point.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which.

Figure 1A:
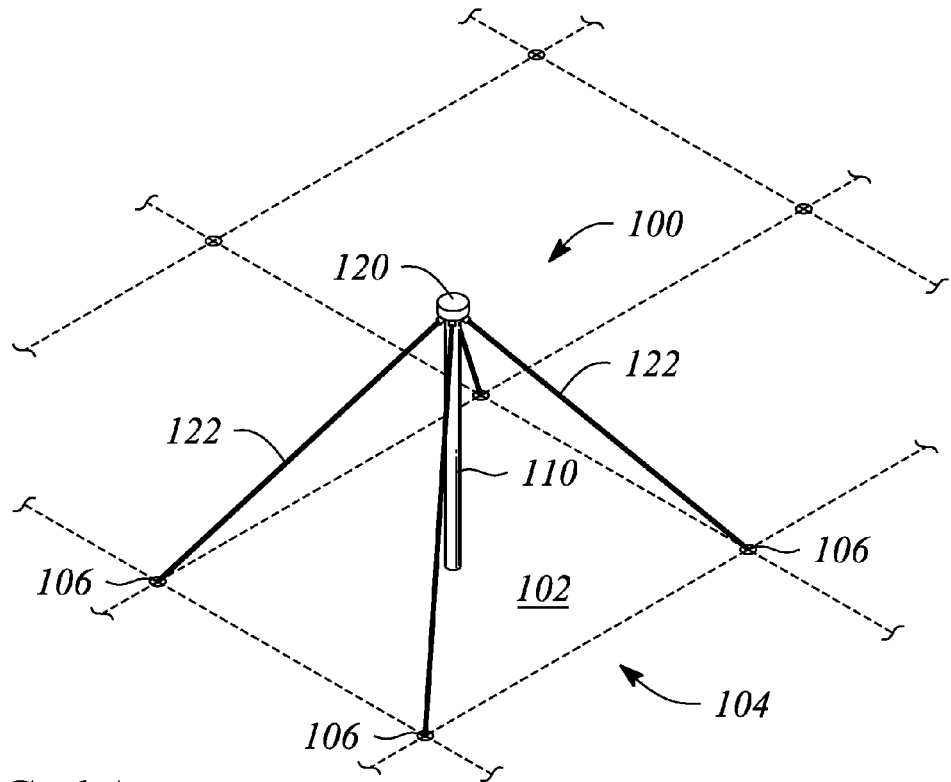
FIG. 1A illustrates a perspective view of a node placement apparatus, according to an embodiment of the present invention.

Certain embodiments of the present invention have other features that are one of in addition to and in lieu of the features illustrated in the above-referenced figures. These and other features of the invention are detailed below with reference to the preceding drawings.

DETAILED DESCRIPTION

Embodiments of the present invention facilitate placing or deploying an array of nodes in a grid pattern. In particular, according to various embodiments, nodes of an array may be rapidly and accurately placed in the grid pattern. Accuracies on the order of plus or minus a few centimeters for grid spacing of tens of meters may be readily achievable, according to some embodiments of the present invention. Moreover, equipment necessary to implement embodiments of the present invention is generally and even commonly available. The embodiments of the present invention have application in a wide variety of fields and situations that require or may benefit from rapid, accurate, low costs placement of a large number of nodes over a large area. Examples of applications that may benefit from embodiments of the present invention include, but are not limited to, deploying vibration sensor nodes of an array used in seismic surveys for subsurface exploration and structural monitoring, deploying nodes of an array of environment sensors (e.g., temperature sensors), solar panel array deployment, deploying construction nodes (e.g., stakes marking corners of buildings, etc.), and deploying agricultural arrays (e.g., seedling, water sprinklers, etc.).

Embodiments of the present invention employ an optical beam directed down toward a surface (e.g., the ground) from an elevated position to illuminate and thus define locations (grid points) for placing nodes. A height of the elevated position is predetermined and known. Similarly, a downward or declination angle of the optical beam is also known a priori and thus is predetermined. Knowing the height of the elevated position and the declination angle allows a distance to be calculated or determined. For example, given a predetermined height h and a declination angle θ, a distance d from a point directly below an origin of the optical beam can be determined from the relationship in equation (1), $$d = \frac{h}{\tan\theta} \quad (1)$$

According to convention and explicitly by definition herein, the declination angle θ is defined as an angle in a plane that is orthogonal to the surface while an azimuth angle φ is defined as an angle in a plane parallel to the surface. By combining the distance d to a defined node location with information regarding an azimuth angle of the optical beam, a precise position for node placement on the surface is determined.

The defined locations for node placement form a grid pattern on the surface. In some embodiments, the grid pattern represents a regular grid such as, but not limited to, a rectangular grid, a circular grid and a triangular grid. In some embodiments, the grid pattern may be a relatively small grid that includes only a small number of nodes or locations defined by the optical beam. The relatively small grid may be referred to as a 'basic' or unit grid. For example, the unit grid may comprise four corners of a rectangle. However, an arbitrarily large grid may be defined by a step-and-repeat application of the present invention that extends or adds on to the unit grid. In particular, a plurality of unit grids may be interconnected or 'stitched together' to produce the arbitrarily large grid.

As used herein, the term 'node' is defined and employed to mean an individual element or item that is part of an array or network of elements (e.g., a sensor system). For example, the node may be a sensor node of a sensory array, a solar panel of a solar array, a seedling in an array of plants being deployed in a precision agricultural array, a stake or another marker used in construction, or a similar element or item. As such, herein the term 'element' and the term 'node' may be used interchangeably. For example, 'sensor node' and 'sensor' may be used interchangeably to mean the same thing unless otherwise noted. The sensor node may be one or more of a vibration sensor, an accelerometer, a seismic sensor (e.g., a geophone), an angle sensor, an audio sensor, a wind sensor (e.g., an anemometer), an electromagnetic sensor (e.g., one or more of an optical sensor, a capacitive sensor, an electric field sensor, and a magnetic field sensor), a temperature sensor, a moisture sensor, and a pressure sensor, for example. In particular, the sensor node may comprise more than one type of sensor (e.g., a pressure sensor and a temperature sensor).

Further herein, an optical source may be any source of electromagnetic radiation that emits an optical signal or 'optical beam' in an optical frequency range or optical spectrum. For discussion purposes, an optical range includes signals with frequencies that are generally considered optical frequencies. In some embodiments, the optical source emits an optical beam having a spectral frequency range between about 300 gigahertz (GHz), or far infrared, and about 30 petahertz, or extreme ultraviolet. In some embodiments, the optical beam has a spectral frequency in the infrared and to just above a visible range comprising a frequency range between about 1 terahertz (THz) and about 800 THz. In some embodiments, the optical beam has a spectral frequency confined to the visible spectrum (e.g., about 400 THz to 790 THz or a range of wavelengths from about 390 nanometers (nm) to about 750 nm). In yet other embodiments, a spectral frequency of the optical beam emitted by the optical source may be in the near infrared to visible frequency range. For example, the optical source may comprise a laser that emits a visible optical beam (e.g., a red laser) or a near infrared optical beam (e.g., IR laser).

For simplicity herein, no distinction is made between a node and any structures or elements that comprise a node unless such a distinction is necessary for proper understanding. Further, as used herein, the article 'a' is intended to have its ordinary meaning in the patent arts, namely 'one or more'. For example, 'a node' generally means one or more nodes and as such, 'the node' means 'the node(s)' herein. Also, any reference herein to 'top', 'bottom', 'upper', 'lower', 'up', 'down', 'left' or 'right' is not intended to be a limitation herein. Herein, the term 'about' when applied to a value generally means plus or minus 10% unless otherwise expressly specified. Moreover, examples herein are intended to be illustrative only and are presented for discussion purposes and not by way of limitation.

Figure 1B:
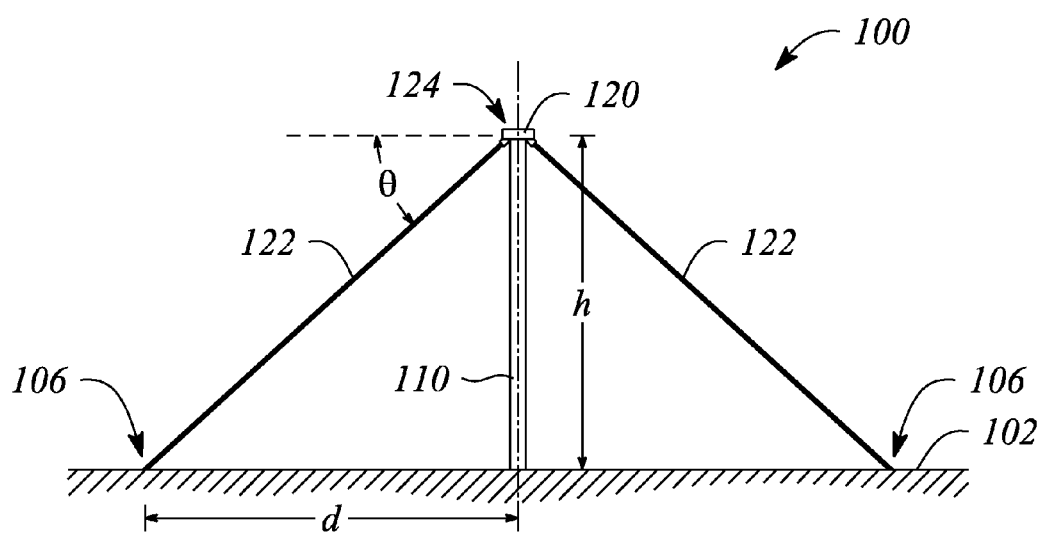
FIG. 1B illustrates a side view of the node placement apparatus of FIG. 1A, according to an embodiment of the present invention.

FIG. 1A illustrates a perspective view of a node placement apparatus 100, according to an embodiment of the present invention. FIG. 1B illustrates a side view of the node placement apparatus 100 of FIG. 1A, according to an embodiment of the present invention. The node placement apparatus 100 facilitates deploying or placing nodes of a system in a regular pattern or a grid 104 on a surface 102. For example, the surface 102 may be the ground (e.g., a field or the ground above an area being explored for subsurface structures or deposits). In various embodiments, the nodes are placed on the surface 102 at discrete points 106 within the grid 104 (e.g., at intersections of lines of the grid 104). According to various embodiments of the present invention, the nodes may be placed manually (e.g., by hand) or automatically (e.g., by a robot or similar vehicle-based deployment system) using the node placement apparatus 100. Further, the node placement apparatus 100 of the present invention may facilitate placement of the nodes at the discrete points 106 of the grid 104 with a level of placement accuracy, according to some embodiments. For example, a placement accuracy level of about ±5 to about ±10 centimeters (cm) or better may be achieved for a grid spacing between adjacent discrete points 106 on the order of tens of meters, according to some embodiments. The grid 104 illustrated in FIG. 1A is a rectangular grid. Other grids include, but are not limited to, circular grids and triangular grids.

The node placement apparatus 100 comprises means for establishing 110 a predetermined height h above the surface 102. According to various embodiments, the predetermined height h may be chosen arbitrarily prior to using the node placement apparatus 100. For example, the predetermined height h may be about 2 meters (m). In another example, the predetermined height h may be about 10 m. In yet another example, the predetermined height h may be chosen to be a multiple of the grid spacing of the grid 104. For example, the predetermined height h may be equal to about two times the grid spacing.

In some embodiments, as illustrated in FIGS. 1A and 1B, the means for establishing 110 a predetermined height comprises a vertical pole 110. The pole 110 may have a predetermined length that is equal to the predetermined height h (e.g., length=h), for example. In some embodiments, the pole 110 is oriented substantially perpendicular to the surface 102. In other embodiments, another means for establishing 110 a predetermined height may be used. For example, the means for establishing 110 a predetermined height may comprise a tripod. The tripod may be sitting on the surface 102, for example. In another example, the means for establishing 110 a predetermined height may comprise a mast mounted on a vehicle, the mast having a length that establishes the predetermined height h above the surface upon which the vehicle travels. In yet another example, the means for establishing 110 a predetermined height comprises an aerial vehicle including, but not limited to, an airplane, helicopter or a balloon, configured to travel at a predetermined altitude to establish the predetermined height h above the surface 102. In yet another example, the means for establishing 110 a predetermined height may comprise one of a building, tower, tree, cliff, and mountain.

The node placement apparatus 100 further comprises an optical source 120. The optical source 120 is positioned at the predetermined height h above the surface 102. The optical source 120 is configured to produce an optical beam 122 having a predetermined declination angle θ. Further, the optical beam 122 produced by the optical source 120 is configured to provide illumination of a plurality of discrete points 106 on the surface 102. The illuminated discrete points 106 define the grid 104. In turn, the defined grid 104 is configured to provide locations for placement of a plurality of nodes being placed, according to embodiments of the present invention. In some embodiments, the node may comprise a sensor and be a sensor node.

By definition herein, the predetermined declination angle θ is measured relative to a plane at the predetermined height h that is substantially parallel to a plane of the surface 102. In particular, the predetermined declination angle θ is measured in a 'declination' direction generally below and away from the substantially parallel plane at the predetermined height h and toward a normal of the plane of the surface 102 (e.g., as illustrated). Moreover, by definition, the predetermined declination angle θ is defined to be greater than zero (0) degrees and less than or equal to 90 degrees.

In some embodiments, the optical source 120 produces a collimated or focused optical beam 122. Examples of optical sources 120 include, but are not limited to, an incandescent bulb, a fluorescent light, a light emitting diode (LED), and a laser. In some embodiments, collimation of the optical beam 122 may be provided by a focusing structure such as, but not limited to, one or both of a parabolic reflector and a lens. For example, the optical source 120 in the form of an incandescent bulb may be one or both of mounted in a parabolic reflector and behind a lens to produce the collimated optical beam 122. In other embodiments, the optical source 120 may produce an inherently collimated optical beam 122. For example, the optical source 120 may comprise a laser.

In some embodiments, in addition to being collimated, the optical beam 122 may be further modified within the optical source 120 using one or more of a filter to adjust a frequency component of the optical beam 122, a mirror configured to change a direction of the optical beam 122 generated by the optical source 120, and a beam splitter configured to divide the optical beam 122 into a plurality of separate optical beams 122. As such, in addition to emitting photons as an optical beam 122, the optical source 120 may comprise one or more of the focusing structure (described above), an optical filter, an optical mirror and a beam splitter, according to some embodiments.

In particular, according to some embodiments (e.g., as illustrated in FIGS. 1A and 1B), the optical source 120 is configured to provide a plurality of simultaneous optical beams 122. In these embodiments, each optical beam 122 of the plurality may separately provide illumination of one of the discrete points 106 on the surface 102. For example, the optical source 120 may provide a plurality of simultaneous optical beams 122 that corresponds with a number of the illuminated discrete points 106 in the plurality of discrete points 106 that make up the grid 104. In some embodiments, the optical source 120 may provide four optical beams 122, each optical beam 122 being oriented to illuminate a different one of four corners of the rectangular grid 104, as illustrated in FIG. 1A, by way of example. For example, each optical beam 122 may be rotated 90 degrees in azimuth relative to an adjacent optical beam 120 to yield a square grid 104.

The optical source 120 may comprise four separate lasers, each producing one of the four optical beams 122, for example. The four exemplary lasers may each be pointed in a different azimuth angle φ toward one of the four discrete points 106 at the corners of the rectangular grid 104, for example. In another example, the optical source 120 may comprise a single laser that provides a single optical beam and a beam splitter that splits the single optical beam into the four separate optical beams 122 that simultaneously illuminate the four exemplary discrete points 106 on the surface 102. In addition to splitting the single optical beam, the beam splitter may further produce the four optical beams 122 such that each optical beam 122 has a different azimuth angle, for example.

However, embodiments of the present invention are not limited to a total of four optical beams provided by four lasers or equivalently four optical outputs of an optical source. In fact, fewer or more than four optical beams may be used (e.g., 2, 3, 4, 6, 7, 8 or more optical beams), according to some embodiments. Similarly, other combinations of azimuth angles besides 90 degrees may be employed to produce other grid patterns. For example, a first pair of azimuth angles that are less than 90 degrees alternating with a second pair of azimuth angles that are greater than 90 degrees may be employed to produce a non-square, rectangular grid pattern.

Figure 2:
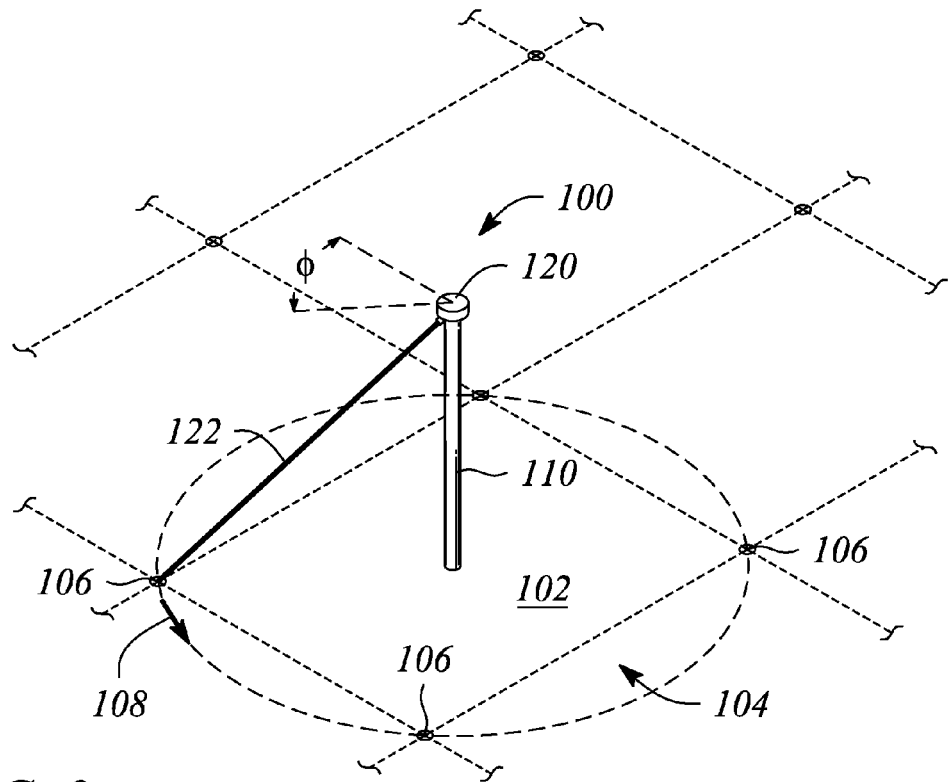
FIG. 2 illustrates a perspective view of a node placement apparatus, according to another embodiment of the present invention.

FIG. 2 illustrates a perspective view of a node placement apparatus 100, according to another embodiment of the present invention. In particular, as illustrated, the optical source 120 comprises a scanning optical source 120. The scanning optical source 120 is configured to sequentially illuminate each of the discrete points 106 on the surface 102. For example, the scanning optical source 120 may comprise a scanning laser that sequentially points toward and illuminates each discrete point 106. In some embodiments (e.g., as illustrated in FIG. 2), the scanning optical source 120 may scan the optical beam 122 around a circular path 108 on the surface 102. The circular path 108 periodically intersects the grid 104 to sequentially illuminate the discrete points 106 on the surface 102. In other embodiments, the grid pattern is a circle scanned by the circular path, or another scan path or scan pattern besides the circular path 108 or grid pattern 104 may be employed. For example, the scan path may be based on a raster scan or a random scan.

In some exemplary embodiments, the scanning optical source 120 may comprise a laser that emits the optical beam 122 and a rotating mirror that scans the optical beam 122 in azimuth angle φ. In some embodiments, the rotating mirror may scan the optical beam 122 a total of 360 degrees in azimuth angle φ, for example. The rotating mirror may also provide the predetermined declination angle θ of the optical beam 122, in some embodiments. In other embodiments, the scanning optical source 120 may comprise an optical source 120 that rotates about a central axis (e.g., a rotating laser). In yet other embodiments, another rotating optical element (e.g., a prism or a lens) may be employed to scan the optical beam when implementing the scanning optical source 120.

In some embodiments, the scanning optical source 120 (e.g., laser) is gated. As used herein, 'gating' is defined as modulating the optical beam 122 in a manner substantially synchronized with scanning of the scanning optical source 120. Gating of the optical source 120 may be provided by a means for gating 124 such as, but not limited to, an optical switch or modulator that modulates the optical beam 122 and an electronic switch or modulator that modulates production of the optical beam 122 by the optical source 120. For example, the gating may comprise modulating the optical beam 122 using ON-OFF Keying (OOK) and may be configured to activate (e.g., turn ON) the optical beam 122 only when the scanning optical source 120 is pointing in a direction corresponding to a particular discrete point 106 on the surface 102, for example as illustrated in FIG. 2. In other words, the optical beam 122 may be alternately turned ON and then turned OFF as the scanning optical source 120 scans in azimuth φ. A timing of the On/Off sequencing may be synchronized to the scanning such that only the discrete points 106 on the surface are illuminated by the optical beam 122.

In some embodiments, the optical source 120 may cooperate with the nodes being placed, in accordance with the node placement apparatus 100. For example, a node (e.g., a sensor node) may comprise an optical detector. The optical detector may be configured to detect the optical beam 122 from the optical source 120. Further, the node may be configured to respond to detection of the optical beam 122. The response may comprise sounding an audible signal or illuminating an optical signal on a housing of the node, for example. The response may signal that the node is at one of the illuminated discrete points 106, for example, to facilitate placement of the node on the discrete point 106, for example.

In some embodiments, the cooperation may further comprise gating the detection of the optical beam 122. Gating the detection may be used in conjunction with the scanning optical source 120 embodiment illustrated in FIG. 2, for example. In particular, gating the detection of the optical beam 122 may be performed in a manner that is synchronized with the scanning of the scanning optical source 120. Gating the detection may provide an alternative to gating the scanning optical source 120, for example. In other examples, gating the detection may be used to augment gating the scanning optical source 120.

Figure 3:
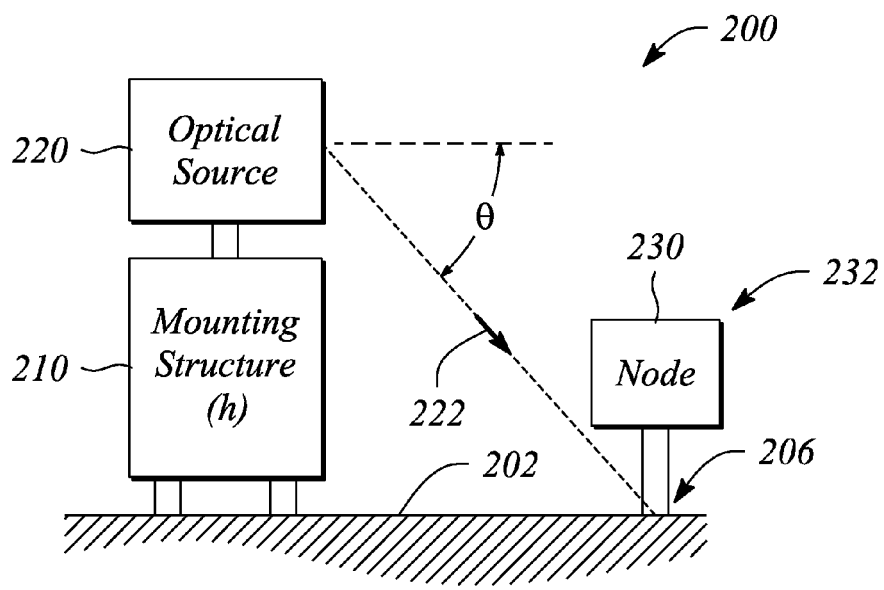
FIG. 3 illustrates a block diagram of a node placement system, according to an embodiment of the present invention.

FIG. 3 illustrates a block diagram of a node placement system 200, according to an embodiment of the present invention. The node placement system 200 operates in conjunction with, or provides placement on, a surface 202. The surface 202 may be the ground, for example, or a surface of a bridge or another structure under evaluation. In some embodiments, the node may comprise a sensor and be a sensor node.

As illustrated in FIG. 3, the node placement system 200 comprises a mounting structure 210. The mounting structure 210 is configured to provide a predetermined height h above the surface 202. In some embodiments, the mounting structure 210 is substantially similar to the means for establishing 110 a predetermined height described above with respect to the node placement apparatus 100. For example, the mounting structure 210 may comprise a pole of a predetermined length extending vertically from and substantially orthogonal to the surface 202.

The node placement system 200 further comprises an optical source 220. The optical source 220 is positioned on the mounting structure 210 at the predetermined height h. The optical source 220 is configured to produce an optical beam 222 having a predetermined declination angle θ. Further, the optical source 220 is configured to provide illumination of a plurality of discrete points 206 on the surface 202. Only one discrete point 206 is illustrated in FIG. 3 for simplicity of illustration only. In some embodiments, the optical source 220 is substantially similar to the optical source 120 described above with respect to the node placement apparatus 100.

In particular, in some embodiments, the optical source 220 is configured to provide a plurality of simultaneous optical beams 222. Each optical beam 222 provides illumination of one of the discrete points 206 on the surface 202. In other embodiments, the optical source 220 produces an optical beam 222 that scans sequentially from one of the discrete points 206 to another. The scanning optical beam 222 may be activated only when pointed in a direction corresponding with one of the discrete points 206, in some embodiments.

The node placement system 200 further comprises a plurality of nodes 230. Only one node 230 is illustrated in FIG. 3 for simplicity of illustration only. The plurality of discrete points 206 is configured to provide locations for corresponding ones (i.e., individual nodes 230) of the plurality of nodes 230. For example, the nodes 230 may comprise sensors such as, but not limited to, seismic sensors that are placed in a grid on the ground for subsurface exploration purposes.

In some embodiments, a node 230 of the plurality comprises an optical detector 232. The optical detector 232 may be configured to detect the optical beam 222 of the optical source 220. Further, the node 230 is configured to respond to detection of the optical beam 222 by the optical detector 232. The response may comprise sounding an audible signal or illuminating an optical signal on a housing of the node 230, for example. The response may signal that the node 230 is at one of the illuminated discrete points 206, for example, to facilitate placement of the node 230 on the discrete point 206, for example. In other embodiments, the detection and response may provide cooperation between the node 230 and the optical source 220 (e.g., when using a scanning optical source 220), as is described above with respect to the scanning optical source 120 of the node placement apparatus 100.

Figure 4:
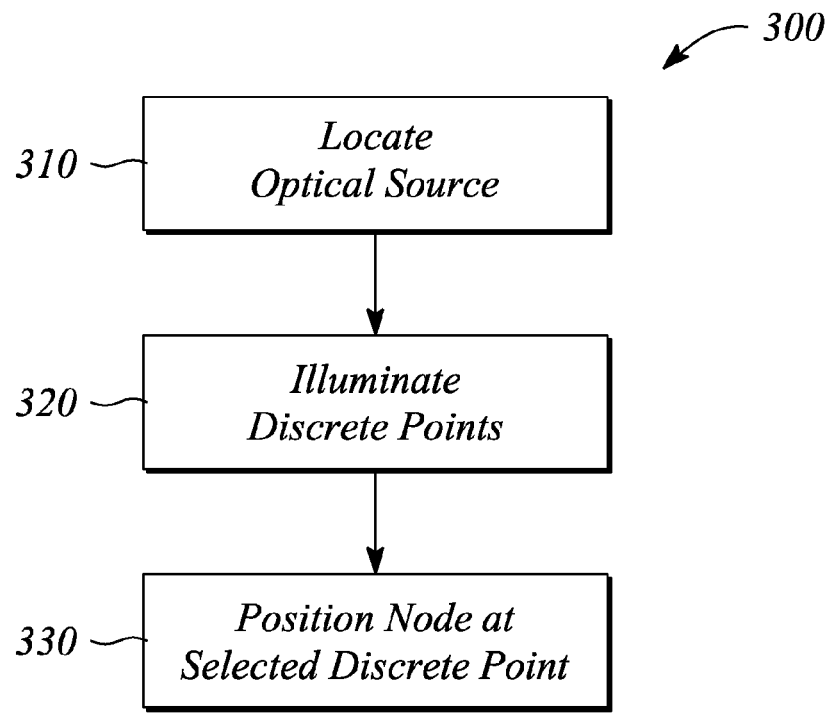
FIG. 4 illustrates a flow chart of a method of node placement, according to an embodiment of the present invention.

FIG. 4 illustrates a flow chart of a method 300 of node placement, according to an embodiment of the present invention. The method 300 of node placement comprises locating 310 an optical source above a fixed point on and at a predetermined height above a surface. For example, the fixed point may be a reference point at a center of a grid. The optical source is configured to produce an optical beam at a predetermined declination angle θ.

In some embodiments, the method 300 of node placement further comprises illuminating 320 a plurality of discrete points on the surface. The discrete points are illuminated 320 by the optical beam produced by the optical source, according to various embodiments. The discrete points define a grid on the surface. In some embodiments, the grid is a rectangular grid. In other embodiments the grid represents another grid pattern (e.g., a circular grid, a triangular grid, etc.).

In some embodiments, illuminating 320 a plurality of discrete points comprises generating a plurality of simultaneous optical beams at the predetermined declination angle θ with the optical source. Each optical beam may illuminate a different one of the discrete points of the plurality, according to some embodiments.

In other embodiments, illuminating 320 a plurality of discrete points comprises scanning the optical source to sequentially point toward each of the discrete points of the plurality. In some of these embodiments, illuminating 320 a plurality of discrete points further comprises gating the optical source to produce the optical beam only when the optical source is pointing in a direction corresponding to individual ones of the discrete points on the surface.

In some embodiments, the method 300 of node placement further comprises positioning 330 a node at a selected discrete point of the plurality of discrete points that is illuminated 320 by the optical beam. In some embodiments, positioning 330 is repeated until a plurality of nodes is positioned. For example, positioning 330 may be repeated until at least one node is positioned at each of the illuminated 320 discrete points.

In some embodiments, positioning 330 a node comprises moving a node to a vicinity of the selected discrete point. Positioning 330 a node further comprises intercepting the optical beam of the optical source using an optical detector of the node. For example, the optical detector may detect the optical beam, for example. The detection may be relayed to a microprocessor or other circuitry of the node, for example. Positioning 330 a node may further comprise producing a response indicating an interception of the optical beam. The response may be produced by the node, in some embodiments. For example, the response may comprise a light being lit on a housing of the node. In another example, the node may produce an audible alarm when the optical beam is intercepted. In other embodiments, an apparatus separate from the node may be employed to intercept and detect the optical beam. For example, a stand-alone optical detector may be employed. In yet other examples, the optical beam may be visible (or made visible) such that intercepting and detection may be performed manually by a person deploying the nodes, for example.

According to some embodiments, the method 300 of node placement further comprises extending the grid (not illustrated). By extending the grid, it is meant that the grid is extended beyond a basic grid comprising the plurality of discrete points on the surface illuminated 320 by the optical beam using the located 310 optical source. Extending employs a 'step and repeat' process that sequentially creates a plurality of new locations for node placement adjacent to the previously illuminated 320 plurality of discrete points.

In some embodiments, extending the grid comprises relocating the optical source to be above another fixed point on and at a predetermined height above the surface. In some embodiments, the predetermined height after relocation is the same as the predetermined height of locating 310. Extending the grid further comprises illuminating another plurality of discrete points on the surface using the optical beam. In some embodiments, a location of at least one of the illuminated discrete points of the other plurality of discrete points corresponds to a location of a discrete point of the plurality discrete points illuminated before relocating the optical source. In this way, the grid may be extended in by a step and repeat application of locating 310, illuminating 320 and positioning 330.

Figure 5:
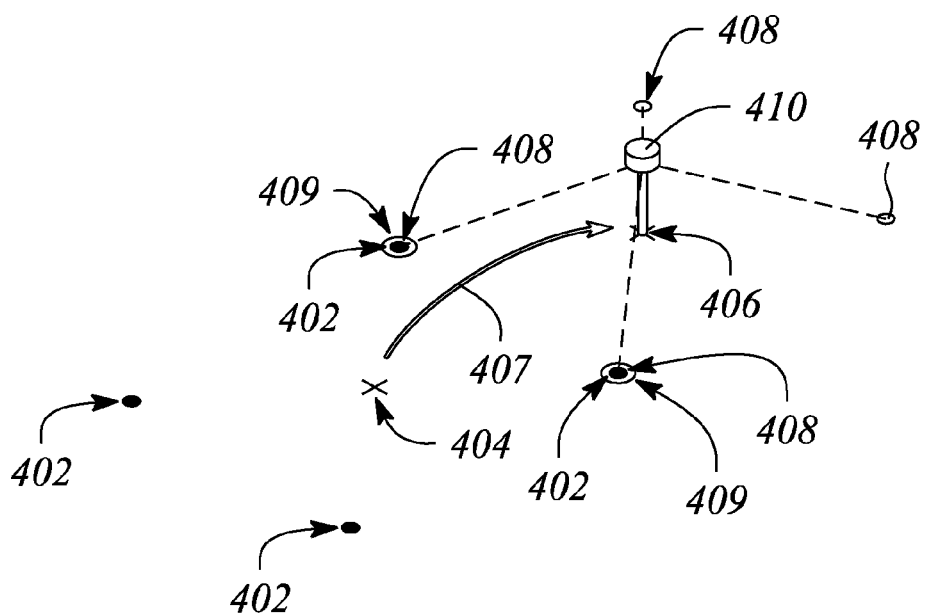
FIG. 5 illustrated a perspective view of extending a grid, according to an embodiment of the present invention.

FIG. 5 illustrates a perspective view of extending a grid, according to an embodiment of the present invention. In particular, FIG. 5 illustrates a first grid of discrete points 402. These discrete points 402 may represent points illuminated 320 by the optical beam prior to relocating the optical source 410, for example. A point 404 represents a fixed point on the surface above which the optical source 410 was located 310 before illumination 320 of the discrete points 402. Further, nodes may have been positioned 330 at each of the discrete points 402.

Moreover, FIG. 5 illustrates the optical source 410 positioned above another fixed point 406 to provide the predetermined height following relocation. Relocation is indicated by the arrow 407 that extends from the first-mentioned position 404 to the relocation position 406. Also illustrated in FIG. 5 are the other plurality of discrete points 408 on the surface that are illuminated by the relocated optical source 410. Two of the discrete points 408 are collocated with two of the discrete points 402 before relocation, as indicated by circles 409.

Thus, there have been described embodiments of a node placement apparatus and system as well as a method of node placement that employ an optical beam to establish locations for the node placement. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. A node placement apparatus comprising:
   moveable means for establishing a predetermined height above a surface through contact with the surface; and
   an optical source positioned at the predetermined height above the surface via the moveable means for establishing the predetermined height above the surface and configured to produce an optical beam having a predetermined declination angle, the optical beam being configured to provide illumination of a plurality of discrete points on the surface, the discrete points defining a grid, wherein the defined grid is configured to provide locations for placement of a plurality of nodes.

2. The node placement apparatus of claim 1, wherein the means for establishing a predetermined height comprises a pole of predetermined length, the pole being oriented substantially perpendicular with the surface.

3. The node placement apparatus of claim 1, wherein the optical source comprises a laser, and wherein the plurality of nodes comprises a plurality of sensor nodes.

4. The node placement apparatus of claim 1, wherein the optical source is configured to provide a plurality of simultaneous optical beams, an optical beam of the plurality of simultaneous optical beams being configured to illuminate one of the discrete points on the surface.

5. The node placement apparatus of claim 1, wherein the optical source comprises a scanning optical source, the scanning optical source being configured to sequentially illuminate the discrete points on the surface.

6. The node placement apparatus of claim 5, wherein the scanning optical source comprises means for gating, the means for gating being configured to activate the optical beam only when the scanning optical source is pointing in a direction corresponding to a particular discrete point on the surface.

7. The node placement apparatus of claim 1, wherein the plurality of discrete points on the surface comprises four discrete points, the grid being a rectangular grid, the four discrete points defining corners of a rectangle of the rectangular grid.

8. A node placement system comprising the node placement apparatus of claim 1, further comprising the plurality of nodes, 9. The node placement system of claim 8, wherein a node of the plurality of nodes comprises an optical detector configured to one or both of detect and respond to the optical beam of the optical source.

10. A node placement system comprising:
    a movable mounting structure configured to provide a predetermined height above a surface via contact with the surface;
    an optical source positioned on the movable mounting structure at the predetermined height, the optical source being configured to produce an optical beam having a predetermined declination angle and providing illumination of a plurality of discrete points on the surface; and
    a plurality of nodes, the plurality of discrete points being configured to provide locations for corresponding ones of the plurality of nodes, wherein the plurality of discrete points defines a grid on the surface.

11. The node placement system of claim 10, wherein the optical source is configured to provide a plurality of simultaneous optical beams, each optical beam being configured to illuminate a different one of the discrete points on the surface.

12. The node placement system of claim 10, wherein the plurality of discrete points on the surface comprises four discrete points, the grid, being a rectangular grid, the four discrete points defining corners of a rectangle of the rectangular grid.

13. The node placement system of claim 10, wherein a node of the plurality of nodes comprises an optical detector configured to detect the optical beam of the optical source, the node being configured to respond to the detection of the optical beam.

14. The node placement system of claim 10, wherein the optical source is configured to produce a scanning optical beam, the scanning optical beam being configured to sequentially illuminate the plurality of discrete points, and wherein the system further comprises means for gating one or both of the scanning optical beam and an optical detector on a node of the plurality of nodes, the means for gating being configured to cooperatively define locations of the discrete points.

15. A method of node placement, the method comprising:
   locating an optical source above a fixed point on and at a predetermined height above a surface, the optical source being configured to produce an optical beam at a predetermined declination angle;
   illuminating a plurality of discrete points on the surface, the discrete points being illuminated by the optical beam produced by the optical source;
   positioning at least one node at at least one selected discrete point of the plurality illuminated by the optical beam, wherein the discrete points define a grid on the surface; and
   removing the optical source after positioning the at least one node.

16. The method of node placement of claim 15, wherein positioning a node comprises:
   moving a node to a vicinity of the selected discrete point;
   intercepting the optical beam of the optical source using an optical detector of the node; and
   producing a response indicating interception of the optical beam, wherein the node is placed when the response is produced.

17. The method of node placement of claim 15, wherein illuminating a plurality of discrete points comprises generating a plurality of simultaneous optical beams at the predetermined declination angle with the optical source, each optical beam illuminating a different one of the discrete points.

18. The method of node placement of claim 15, wherein illuminating a plurality of discrete points comprises:
   scanning the optical source to sequentially point toward each of the discrete points; and
   gating the optical source to produce the optical beam only when the optical source is pointing in a direction corresponding to individual ones of the discrete points on the surface.

19. The method of node placement of claim 15, further comprising extending the grid, wherein extending the grid comprises:
   relocating the optical source to be above another fixed point on and at the predetermined height above the surface; and
   illuminating another plurality of discrete points on the surface using the optical beam, wherein a location of at least one of the illuminated discrete points of the other plurality of discrete points corresponds to a location of a discrete point of the plurality discrete points illuminated before relocating the optical source.

20. The method of node placement of claim 15, wherein the grid is a rectangular grid, and wherein the node comprises a sensor.

* * * * *

UNITED STATES PATENT AND TRADEMARK OFFICE
CERTIFICATE OF CORRECTION

PATENT NO. : 8,336,217 B2
APPLICATION NO. : 12/790970
DATED : December 25, 2012
INVENTOR(S) : Wei Yi et al.

It is certified that error appears in the above-identified patent and that said Letters Patent is hereby corrected as shown below:

In column 10, line 32, in Claim 8, delete "nodes," and insert -- nodes. --, therefor.

In column 10, line 56, in Claim 12, delete "grid," and insert -- grid --, therefor.

In column 12, line 22, in Claim 19, after "plurality" insert -- of --.

Signed and Sealed this
Twelfth Day of March, 2013

Teresa Stanek Rea
*Acting Director of the United States Patent and Trademark Office*